United States Patent [19]
Watanabe

[11] Patent Number: 5,899,069
[45] Date of Patent: May 4, 1999

[54] SUPERCHARGED INTERNAL COMBUSTION ENGINE

[75] Inventor: Atsushi Watanabe, Suntou-gun, Japan

[73] Assignee: Toyota Jidosha Kabushiki Kaisha, Toyota, Japan

[21] Appl. No.: 08/768,438

[22] Filed: Dec. 18, 1996

[30] Foreign Application Priority Data

Dec. 26, 1995 [JP] Japan .................................. 7-339148

[51] Int. Cl.$^6$ .................................................. F02B 37/18
[52] U.S. Cl. .......................................................... 60/602
[58] Field of Search ............................... 60/602; 123/564

[56] References Cited

U.S. PATENT DOCUMENTS 4,556,038  12/1985  Okamoto et al. ........................ 60/602

FOREIGN PATENT DOCUMENTS 61-105727  7/1986  Japan .
61-113936  7/1986  Japan .

OTHER PUBLICATIONS

My Maintenance Notes [1], Aircraft Engines, Jul. 10, 1981, pp. 150–154, Nippon Koukuugijutsu Kyokai, 1–8–12, Shinbashi, Minato–ku, Tokyo, Japan.

Primary Examiner—Michael Koczo
Attorney, Agent, or Firm—Oliff & Berridge, PLC

[57] ABSTRACT

According to the present invention, a wastegate value is provided at the exhaust gas inlet of a supercharger of the internal combustion engine and the degree of opening of the wastegate valve is controlled by a control unit in accordance with the engine speed. The control unit stores the regions where the engine output increases sharply along with an increase of the engine speed (bootstrap operating region) as ranges of the engine speed, and sets the degree of opening of the wastegate valve in accordance with the speed in the bootstrap operating region, and thereby ensures that the supercharging pressure will rise gradually along with an increase of the engine speed. Due to this, sharp increases in the engine output in the bootstrap operating region are prevented and therefore no bootstrap occurs.

9 Claims, 10 Drawing Sheets

SUPERCHARGED INTERNAL COMBUSTION ENGINE

BACKGROUND OF THE INVENTION

1. Field of the Invention

The present invention relates to a supercharged internal combustion engine and, more particularly, to control of the output of a supercharged internal combustion engine.

2. Description of the Related Art

It is known that when mounting a reciprocating internal combustion engine equipped with a supercharger such as an exhaust gas turbocharger in an aircraft to drive a propulsion propeller, there are operating regions where a so-called "bootstrap" phenomenon occurs.

Here, a "bootstrap" phenomenon means the phenomenon when the degree of opening of the throttle valve of the engine or the speed setting of the governor is held constant during operation but, nevertheless, the engine speed becomes unstable and there are repeated sharp increases and sharp decreases in the engine speed. This bootstrap phenomenon is believed to occur due to the following reasons.

In a supercharged internal combustion engine, an upper limit is set for the engine supercharging pressure to protect the engine and supercharger. Usually, for the control of the engine supercharging pressure, use is made of a mechanical type wastegate valve (hereinafter abbreviated as WGV) arranged in the exhaust pipe at the inlet of the supercharger or a mechanical type intake relief valve or other supercharging pressure control valve provided in the air passage at the outlet of the supercharger. These supercharging pressure control valves are held in the fully closed condition until the supercharging pressure reaches a certain setting. When the supercharging pressure exceeds the setting, they open to suppress the rise of the supercharging pressure. For example, when the WGV opens, part of the exhaust gas bypasses the supercharger, so an increase of the pressure of the exhaust gas flowing into the supercharger (exhaust gas flow rate) is prevented and a rise of the supercharger speed is suppressed. Therefore, the supercharging pressure will not rise to more than the pressure setting. Further, the intake relief valve similarly opens when the supercharging pressure exceeds the setting and releases part of the supercharger outlet air into the atmosphere to suppress the rise of the supercharging pressure.

FIG. 3(A) shows the characteristic of change of the supercharging pressure PD with respect to the engine speed NE in an engine having such supercharging pressure control valve. As shown in FIG. 3(A), while the engine speed NE is low (in FIG. 3(A), region where 0<NE<NE1), since the pressure (flow rate) of the exhaust gas of the engine is low and the supercharger speed does not rise, the supercharging pressure PD is maintained at a substantially constant low value PD1. When the speed of the supercharger rises along with the engine speed and the engine speed reaches NE1 (FIG. 3(A)), the supercharging pressure PD starts to rise. In the region of $NE1 \leq NE < NE2$ in FIG. 3(A), the supercharging pressure PD sharply rises along with the rise of the engine speed NE. Further, when the supercharging pressure PD reaches the setting PD2 of the supercharging pressure (NE=NE2), the supercharging pressure control valve opens, so the supercharging pressure PD is held at the constant value PD2 regardless of the engine speed (region of $NE \geq NE2$). FIG. 3(B) and FIG. 3(C) show the characteristic of the degree of opening of a supercharging pressure control valve (in this case, a WGV) and the characteristic of the engine output with respect to the speed NE, respectively. As shown in FIG. 3(B), the WGV is maintained fully closed in the region where the engine speed NE is lower than NE2. In the region where the speed NE is higher than NE2, the degree of opening of the WGV is increased along with a rise in the speed NE to hold the supercharging pressure PD at the setting PD2.

Therefore, the engine output HP rises relatively gradually in the region where the speed NE is NE<NE1, but the engine output also rises sharply in accordance with a sharp rise of the supercharging pressure PD in the region of $NE1 \leq NE < NE2$. Further, in the region of $NE \geq NE2$, the supercharging pressure PD is maintained at the constant value PD2, so the increase in the engine output once again becomes gradual. Note that the rated output of an engine for an aircraft is usually set to a speed close to that shown by NER in FIG. 3(C).

However, in an aircraft engine, the engine speed NE is determined by the power consumption of the propeller and the engine output. That is, the power consumption of the propeller increases in proportion to the cube of the speed when the pitch is constant. Therefore, in actual operation, when the engine speed rises, the power consumption of the propeller also increases along with the engine output and the engine is operated at a speed where the power consumption of the propeller and the engine output are balanced. Therefore, in the region where the change in engine output with respect to a change in the engine speed is large (for example, the region of $NE1 \leq NE < NE2$), the engine output will end up changing by a large amount even when the engine speed changes slightly due to disturbances etc., and the balance of the power consumption of the propeller and the engine output will end up being lost.

For example, in a case where the engine speed rises slightly in this operating region, the power consumption of the propeller does not change that much when the speed rises just slightly yet the engine output rises by a large margin. Therefore, the rise of the engine speed does not stop at the slight amount of rise of the speed which triggered it and rises all at once to the speed where the increase in the power consumption of propeller due to the rise in the speed and the output determined by the engine output characteristic (FIG. 3 (C)) are balanced.

The condition where the engine speed does not stabilize but repeatedly rises and falls in this way even when the degree of opening of the throttle valve is maintained constant is called a "bootstrap". A bootstrap occurs in the region where the change of the engine output is large with respect to the change of the engine speed such as the region of $NE1 \leq NE < NE2$ in FIG. 3(C), that is, the operating region where the supercharging pressure control valve is generally fully closed. When a bootstrap occurs, the engine speed can no longer be accurately controlled and problems may arise in the operability of the aircraft. Therefore, in the past, the general practice has been to prohibit regular operation in the bootstrap operating region.

The above explanation was made for the case of a fixed pitch propeller, but generally a speed governor using a variable pitch propeller is used for an aircraft engine. A speed governor is a mechanism for adjusting the power consumption of the propeller by changing the pitch of the variable pitch propeller so as to hold a set engine speed. That is, when the propeller pitch changes, the power consumption of the propeller will change even at the same propeller speed. Therefore, when a difference arises between the engine speed during flight and the preset speed, the governor performs control to change the propeller pitch in accordance with the difference between the actual speed and the set speed and hold the engine speed at the set value. In this way, in an engine provided with a speed governor, it is possible to obtain an engine output more stable than the case of a fixed pitch propeller engine.

However, even in an engine provided with such a speed governor, there are cases where bootstrap occurs in a bootstrap operating region where the rate of change of the output with respect to the engine speed is large as mentioned above. That is, in such an engine, when the engine speed rises, the propeller pitch is increased to make the engine speed fall, but in the actual operation, there is a time delay caused by the operational delay etc. of the pitch control mechanism in the time interval from when the rise of the speed is detected to when the propeller pitch increases. Therefore, in the bootstrap operating region where the change of the output with respect to the engine speed is large, the engine speed ends up sharply rising during this delay time and cases arise where bootstrap occurs in the same way as the case of a fixed pitch propeller.

As explained above, bootstrap occurs due to the fact that the characteristic of increase of the engine output due to the rise of the supercharger speed and the characteristic of increase of the engine load (power consumption of the propeller) do not match each other.

While not relating to an aircraft engine, attempts have been made to control the supercharging pressure of the supercharger to make the characteristic of increase of the engine output and the characteristic of increase of the engine load match.

For example, this type of control apparatus is described in Japanese Unexamined Utility Model Publication (Kokai) No. 61-113936. The apparatus of this publication relates to a supercharging pressure control apparatus for a supercharged internal combustion engine used in vehicles. In this vehicular use supercharged internal combustion engine, at the time of vehicle starts and rapid acceleration, the supercharging pressure of the turbocharger rises sharply along with a rise in the engine speed, so the engine output also sharply increases. Therefore, a mismatch occurs between the characteristic of increase of the engine output and the characteristic of increase of the engine load (drive power to drive wheels). This causes slipping of the drive wheels at starts and during acceleration. The apparatus of the above publication is directed to preventing slipping of the drive wheels. The apparatus opens the wastegate valve to correct the supercharging pressure to become lower than the normal pressure setting when the rate of rise of the engine speed exceeds a predetermined value. The apparatus of this publication suppresses sharp rises in the speed of the engine by this correction so as to prevent slipping of the drive wheels from occurring.

The apparatus of the above Japanese Unexamined Utility Model Publication (Kokai) No. 61-113936 is effective in prevention of slipping of drive wheels during vehicle starts and acceleration, but if the apparatus of the publication were applied to a supercharged internal combustion engine for an aircraft, it would not be possible to prevent occurrence of bootstrap.

That is, in the apparatus of the above publication, the wastegate valve is designed to be opened after a sharp rise in the engine speed is detected. However, in an aircraft engine, when a sharp rise of the engine speed occurs, bootstrap is already occurring. Therefore, in the apparatus of this publication, while it is possible to reduce the extent of rise of the supercharging pressure (engine output) after the occurrence of bootstrap, it is not possible to prevent the occurrence of bootstrap itself.

SUMMARY OF THE INVENTION

In view of the problems in the related art as set forth above, the object of the present invention is to provide means to effectively enable prevention of the occurrence of bootstrap in a supercharged internal combustion engine for aircraft.

This object is achieved by an supercharged internal combustion engine, according to the present invention, which comprises a supercharger for supercharging the intake air of the internal combustion engine, operating condition detecting means for detecting an operating condition of the engine, operating region judging means for judging if the operating condition is in a bootstrap operating region of the engine where there is a possibility of engine bootstrap occurring, and bootstrap suppressing means for suppressing an increase of engine output when it is judged by the operating region judging means that the engine is being operated in a bootstrap operating region.

According to the present invention the operating region judging means judges if the engine is being operated in a bootstrap operating region where bootstrap is liable to occur based on the operating condition of the engine, and the bootstrap suppressing means operates to suppress an increase in the engine output when the engine is being operated in a bootstrap operating region. Therefore, rapid changes in the engine output are suppressed and bootstrap does not occur. Here, the operating region judging means may be designed to judge a bootstrap operating region based on, for example, the engine speed, output, supercharging pressure, and other engine operating conditions. Further, the bootstrap suppressing means may open a supercharging pressure control valve such as an intake air relief valve or a wastegate valve, or the like to control the rise in the supercharging pressure and suppress an increase in the engine output.

Further, when the supercharging pressure control valve is used, the degree of opening may be corrected based on the engine speed, the degree of opening of the throttle valve, and the atmospheric conditions such as the atmospheric temperature or the atmospheric pressure.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
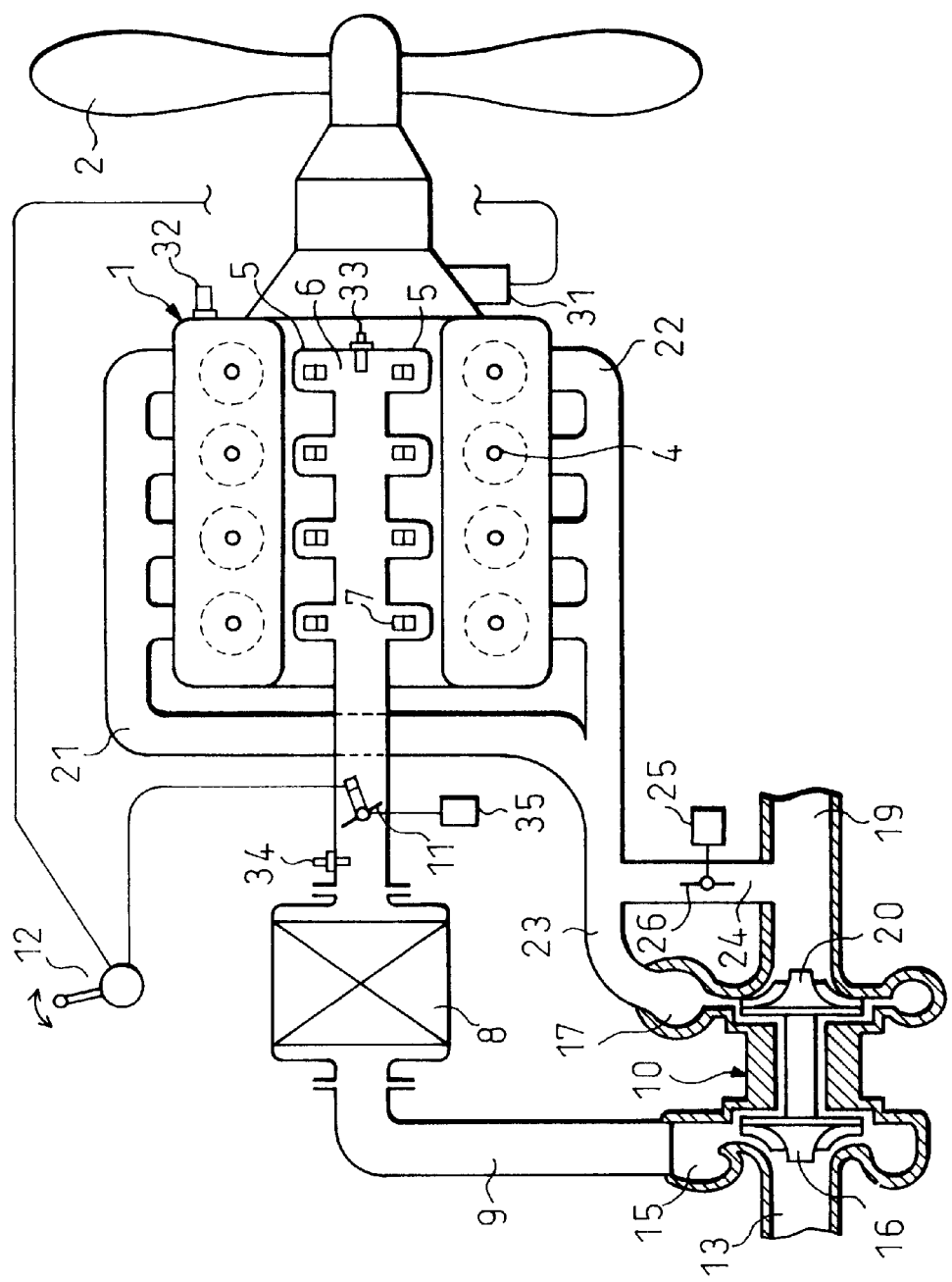
FIG. 1 schematically illustrates an embodiment of the supercharged internal combustion engine according to the present invention.

FIG. 1 is a view of the general configuration of an embodiment of a supercharged internal combustion engine of the present invention. In FIG. 1, reference numeral 1 designates an internal combustion engine and 2 designates a propeller driven by the engine 1. In this embodiment, a multi-cylinder (in FIG. 1, a V type 8-cylinder) 4-cycle reciprocating engine is used for the engine 1. The reference numeral 5 in FIG. 1 designates an intake manifold connecting the intake ports of the cylinders of the engine 1 to a common intake duct 6. Near the connecting portions of the intake ports of the cylinders of the intake manifold are arranged fuel injectors 7 for injecting pressurized fuel to the intake ports of the cylinders.

In FIG. 1, 11 shows a throttle valve arranged in the intake duct 6 downstream of an intercooler 8. The throttle valve 11 is connected to a power lever 12 provided at the pilot's seat and assumes a degree of opening according to the amount of operation of the power lever 12. Further, 8 shows the intercooler provided on the intake duct 6, 10 an exhaust turbocharger, and 9 an intake duct connecting the discharge port 15 of a compressor 16 of the turbocharger 10 and the intercooler 8.

Further, in FIG. 1, reference numeral 21 and 22 show intake manifolds connecting the exhaust ports of the cylinders of the banks at the two sides of the engine 1 with a common exhaust pipe 23. The common exhaust pipe 23 is connected to the exhaust inlet 17 of the exhaust turbine 20 of the turbocharger 10.

The turbocharger 10 in this embodiment is comprised of a radial compressor 16 and a radial exhaust turbine 20 for driving the compressor 16. The intake air of the engine 1 flows from the air cleaner (not shown) through the intake inlet pipe 13 to the compressor 16. In the compressor 16, the air is raised in pressure to become supercharged air and is supplied to the intercooler 8 from the intake duct 9. After being cooled at the intercooler 8, it passes through the intake duct 6, throttle valve 11, and intake manifold 5 to be supplied to the cylinders of the engine 1.

Further, the exhaust gas of the engine 1 passes from the exhaust manifold 21 and 22 through the exhaust pipe 23 and flows from the exhaust inlet 17 to the turbine 20. This exhaust gas drives the rotation of the turbine and the compressor 16 connected to the same, then is discharged from the exhaust outlet pipe 19.

Further, in this embodiment, an exhaust bypass passage 24 is provided for connecting the exhaust pipe 23 and the exhaust outlet pipe 19 of the turbine 20. In the exhaust bypass passage 24 is provided a wastegate valve 26 for controlling the flow rate of the exhaust gas bypassing the exhaust turbine 20 from the bypass passage 24 and flowing to the exhaust outlet pipe 19. When the wastegate valve (WGV) 26 is fully closed, the entire amount of the exhaust gas from the engine 1 flows to the turbine 20, so the speed of the turbocharger 10 rises and the outlet pressure (supercharging pressure) of the compressor 16 becomes high. On the other hand, when the WGV 26 opens, part of the exhaust gas of the engine 1 bypasses the turbine 20 and flows out to the exhaust outlet pipe 19, so the flow rate of the exhaust gas passing through the turbine 20 drops. Therefore, the speed of the turbocharger 10 falls and the supercharging pressure falls in accordance with the degree of opening of the WGV 26. That is, by adjusting the degree of opening of the WGV 26, it is possible to make the supercharging pressure of the engine 1 a desired level.

In the embodiment of FIG. 1, the WGV 26 is driven by an actuator 25 comprised of a DC motor. The actuator 25 operates in accordance with a command signal from a later mentioned engine electrical control unit (EEC) 30 (FIG. 2) and controls the WGV 26 to a degree of opening in accordance with the command signal from the EEC 30. Note that as the actuator 25, it is also possible to use an actuator other than a DC motor so long as it can drive the WGV 26 to the degree of opening in accordance with the command signal from the EEC 30. For example, it is also possible to use an electrical/hydraulic pressure type actuator etc.

In this embodiment, the propeller 2 driven by the engine 1 is a variable pitch propeller, and a speed governor 31 for controlling the propeller pitch of the propeller 2 is provided. In this embodiment, the propeller governor 31 is a centrifugal type governor and is connected through a rotation transmission shaft (not shown) to a drive shaft of the propeller. The propeller governor 31 acts to adjust the propeller pitch so that the engine speed (propeller speed) matches the speed setting. That is, when the propeller speed becomes higher than a certain speed setting, the governor 31 makes the propeller pitch increase and increases the power absorbed by the propeller so as to cause the engine speed to drop. Further, when the propeller speed becomes lower than the speed setting, the governor 31 reduces the propeller pitch and causes the power absorbed by the propeller to fall so as to cause the engine speed to increase. By this, the propeller speed (engine speed) is controlled to match with the speed setting of the propeller governor. In this embodiment, the speed governor 31 and the throttle valve 11 are connected to a common power lever 12 via respective control cables. Therefore, by operating this single power lever 12, it is made possible to simultaneously control both of the degree of opening of the throttle valve 11 (engine output) and the engine speed (pitch of propeller 2). In this embodiment, the control cables for controlling the throttle valve 11 and governor 31 are connected to the power lever through cams of shapes determined in accordance with the aerodynamic characteristics of the aircraft body. Therefore, the characteristics of change of the amounts of operation of the throttle valve 11 and governor 31 with respect to the amount of operation of the power lever 12 can be set to suitable characteristics to provide the optimal engine output/speed characteristics in accordance with the aerodynamic characteristics of the aircraft body.

Figure 2:
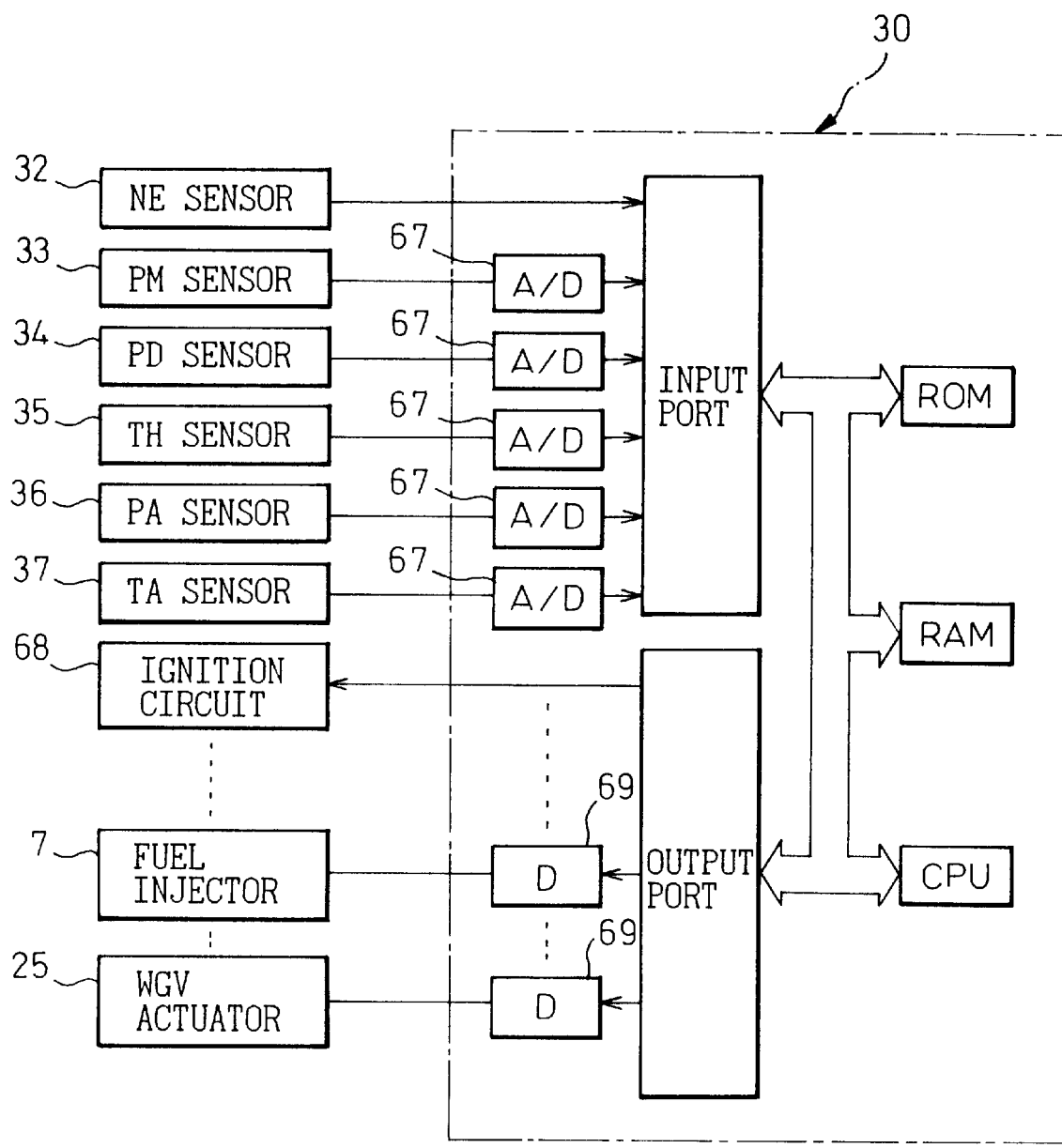
FIG. 2 is a block diagram showing a control apparatus of the embodiment of FIG. 1.

FIG. 2 is a view of the configuration of the EEC (engine electric control unit) 30 for controlling the engine 1. As shown in FIG. 2, the EEC 30 in this embodiment is comprised of a microcomputer of a known configuration including a ROM, RAM, CPU, input port, and output port connected with each other by a bi-directional bus. In this embodiment, the EEC 30 performs the control of the fuel injection of the engine 1, the control of the ignition timing, and other basic control and also the control of the later mentioned supercharging pressure for suppressing bootstrap. For these controls, a pulse signal having a frequency proportional to the engine speed NE is supplied to the input port of the EEC 30 from an NE sensor 32 provided on a crankshaft (not shown) of the engine 1. The CPU of the EEC 30 calculates the engine speed NE based on the pulse signal and uses it for the various control operations mentioned later.

Further, a voltage signal from a PM sensor 33 disposed in the intake duct 6 downstream of the throttle valve 11 which is proportional to the absolute pressure PM in the intake duct 6, and a voltage signal from a PD sensor 34 provided in the intake duct 6 upstream of the throttle valve 11 which is proportional to the supercharging pressure (deck pressure) PD (absolute pressure) of the turbocharger 10 are fed to the input port of the EEC 30 through the AD converters 67. Further, the input port of the EEC 30 receives, as input through the AD converters 67, a voltage signal based on the degree of opening TH of the throttle valve 11 from a TH sensor 35, a voltage signal based on the atmospheric temperature TA from the TA sensor 37, and a voltage signal based on the atmospheric pressure PA from a PA sensor 36.

The output port of the EEC 30 is connected to the spark plugs 4 and fuel injectors 7 of the cylinders of the engine 1 through an ignition circuit 68 and drive circuit 69 and controls ignition timing of the engine 1 and the amount and timing of fuel injection. In this embodiment, the EEC 30 determines the optimal fuel injection amount, injection timing, and ignition timing from the intake pressure PM and engine speed NE detected by the PM sensor 33 and NE sensor 32 based on a numerical table stored in the ROM in advance. Then, the EEC 30 injects fuel from the fuel injectors 7 and ignites spark plugs 4 in accordance with the determined values.

Further, the output port of the EEC 30 is connected through the drive circuit 69 to an actuator 25 of the WGV 26 and controls the degree of opening of the WGV 26 to control the supercharging pressure as explained below.

Next, an embodiment of control for bootstrap suppression control according to the present invention will be explained with reference to FIGS. 4(A) and 4(B). In this embodiment, the WGV 26 is opened in an operating region where bootstrap is liable to occur (hereinafter, this operating region is referred to as the "bootstrap operating region") even when the supercharging pressure PD does not reach the upper limit PD2 for engine protection. By doing so, the supercharging pressure is made to gradually rise in the operating region where bootstrap is liable to occur and a sharp increase in output of the engine 1 accompanying a rise in the speed is suppressed. As explained above, bootstrap occurs since the rate of change of the output with respect to the speed of the engine 1 becomes larger than the rate of change of the power consumption of the propeller 2. Accordingly, by suppressing sharp increases in the output of the engine 1 and keeping the rate of change of the output small, it becomes possible to prevent the occurrence of bootstrap.

In this embodiment, during engine operation, the EEC 30 judges whether the engine is being operated in a bootstrap operating region based on the speed NE. If it is being operated in a bootstrap operating region, it sets the target value PDT of the deck pressure (supercharging pressure) PD in accordance with the speed NE and controls the WGV 26 so that the actual deck pressure matches the target value PDT.

Figure 3A:
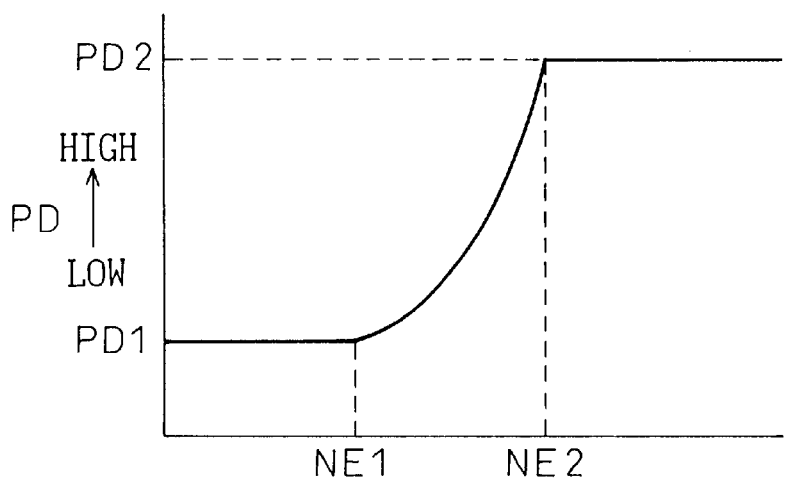
FIGS. 3(A), 3(B) and 3(C) are diagrams showing the reasons for the occurrence of the bootstrap phenomenon.
Figure 3B:
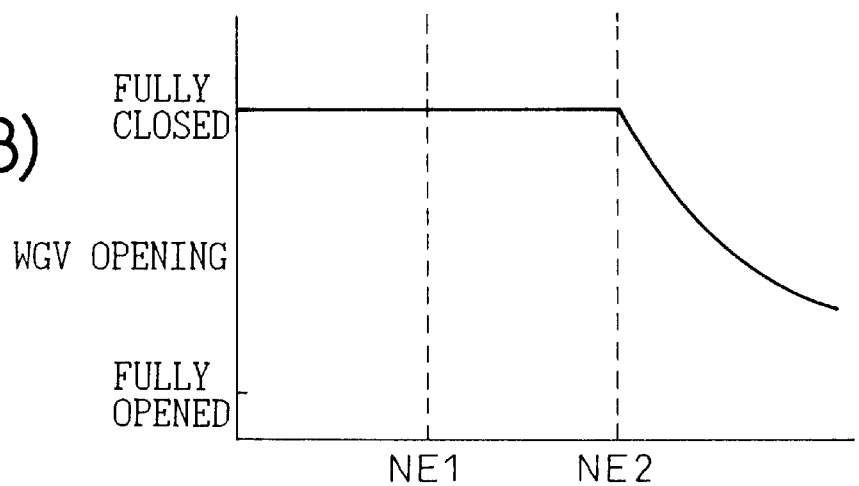
Figure 3C:
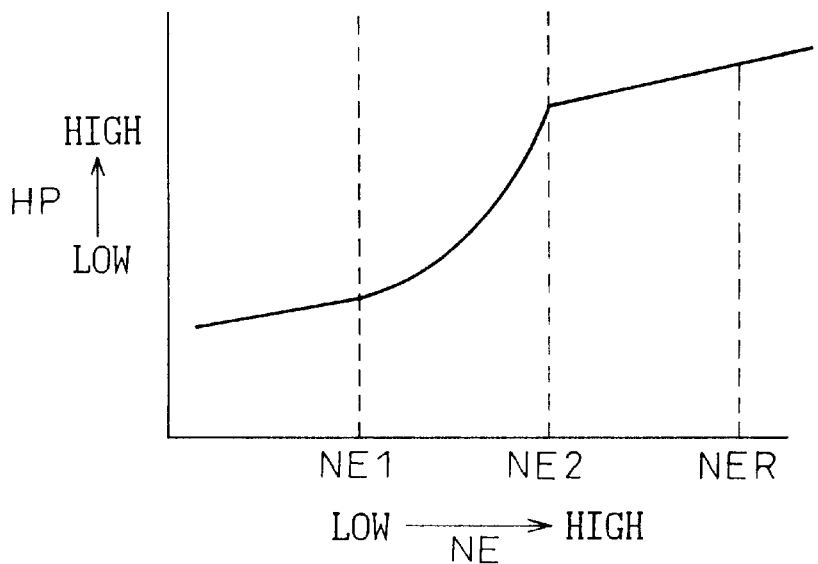

As explained above, in this embodiment, the power lever 12 is used to simultaneously control the degree of opening of the throttle valve 11 and the speed setting of the governor 31. Therefore, when the WGV 26 is fully closed, the relationship between the engine speed and engine output is fixedly determined. Therefore, by finding in advance the relationship between the engine speed and engine output as shown in FIG. 3(C) using an actual engine, it is possible to specify the regions susceptible to occurrence of bootstrap using the engine speed NE (for example, the region of NE1$\leq$NE<NE2 in FIG. 3(C)). Note that in this embodiment, since the relationship between the engine speed NE and engine output is fixedly determined in this way, it is also possible to specify the bootstrap operating regions using the engine output HP or other parameters representative of the engine output in addition to the engine speed NE.

Further, when the degree of opening of the throttle valve and the speed setting are fixedly determined in this way, when the speed is the same, since the engine output changes in accordance with the deck pressure PD, it is possible to obtain the desired engine speed/output characteristic by using the WGV 26 to control the deck pressure PD in accordance with the speed NE.

Figure 4A:
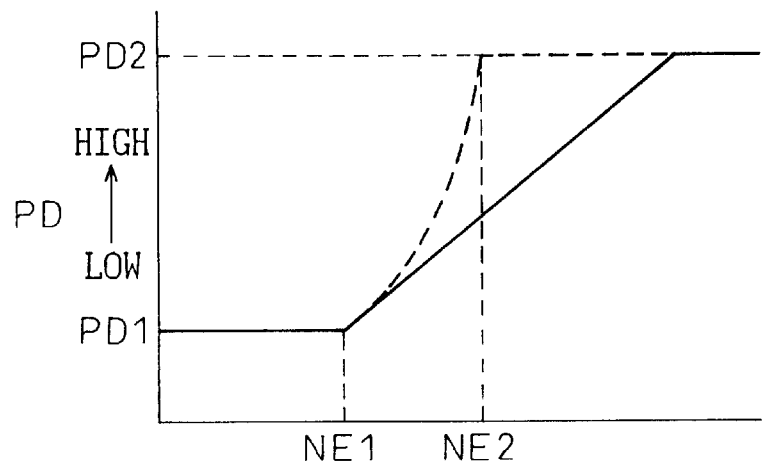
FIGS. 4(A) and 4(B) are graphs explaining an embodiment of the deck pressure control of the engine of FIG. 1.
Figure 4B:
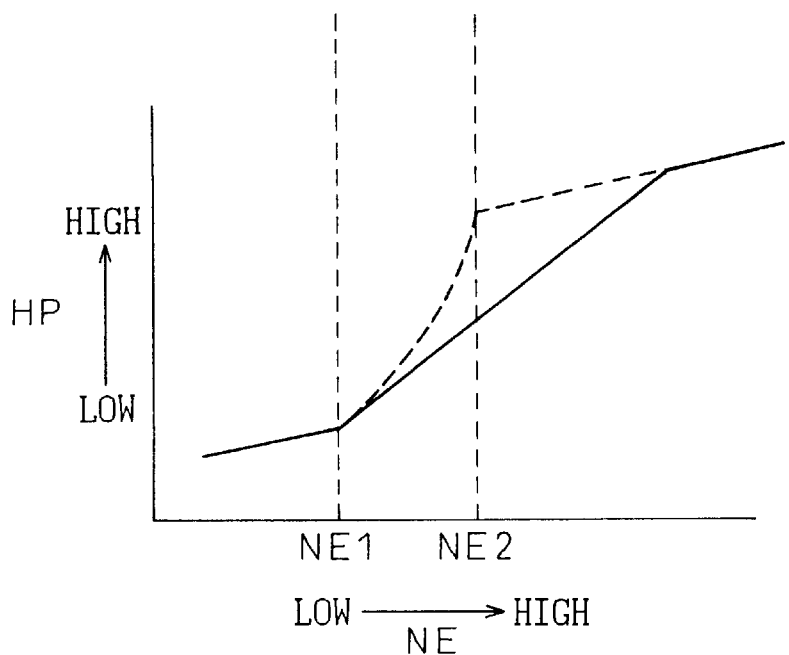

FIG. 4(A) is a view of the relationship between the setting PDT of the deck pressure PD and the engine speed NE in this embodiment. The solid line in FIG. 4(A) shows the deck pressure target value PDT in this embodiment, while the broken line shows the change in the deck pressure when the WGV 26 is held in the fully closed condition in a bootstrap operating region as shown in FIG. 3(A). As shown in FIG. 4(A), in this embodiment, the target value PDT is set so that the deck pressure PD rises linearly with a gradual gradient from the lower limit speed NE1 of the bootstrap operating region to reach the upper limit PD2 of the deck pressure. FIG. 4(B) shows the characteristic of change of the engine output HP with respect to the engine speed NE in the case of control of the deck pressure as in FIG. 4(A). As shown by the solid line in FIG. 4(B), in this embodiment, the engine output rises gradually in accordance with the change of the deck pressure PD (FIG. 4(A)) and no sharp change occurs with respect to the engine speed as in the past (shown by broken line) even in the former bootstrap operating region (region of NE1$\leq$NE<NE2).

Therefore, according to this embodiment, bootstrap no longer occurs even in the former bootstrap operating region, so it becomes possible to operate the engine steadily in this region and becomes possible to greatly improve the operability of the aircraft.

Note that the deck pressure setting PDT of FIG. 4(A) must be set to a gradient where no bootstrap occurs in view of the characteristic of change of the power consumption of the propeller 2. It is preferably determined by experiments etc. using an actual engine 1 and propeller 2.

Figure 5:
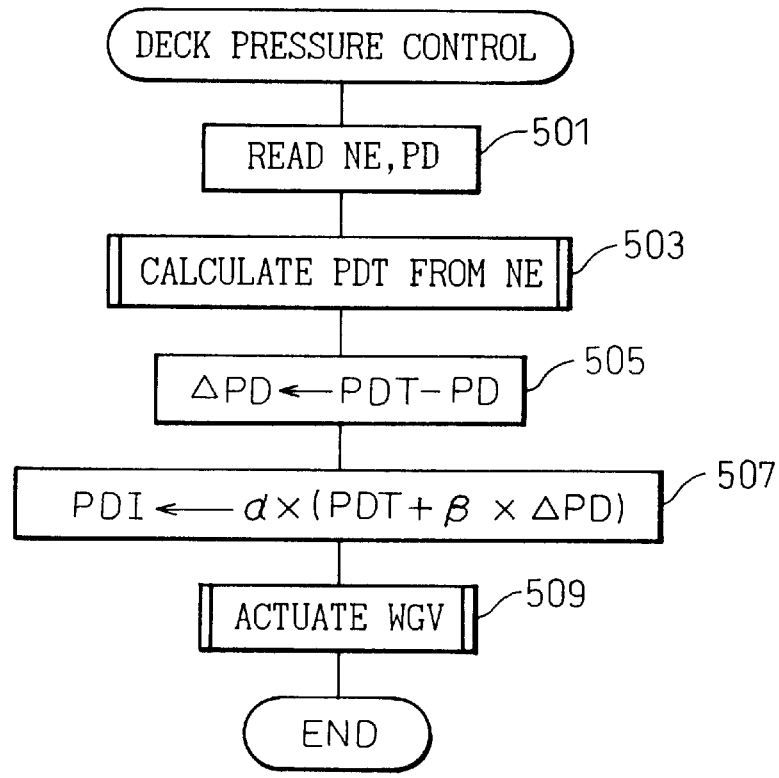
FIG. 5 is a flow chart showing the deck pressure control explained in FIGS. 4(A) and 4(B)

FIG. 5 is a flow chart of the control of the deck pressure in this embodiment. The routine is executed by the EEC 30 at every predetermined time interval.

When the routine starts in FIG. 5, at step 501, the engine speed NE and deck pressure PD are read from the NE sensor 32 and PD sensor 34. Further, at step 503, the deck pressure target value PDT is calculated from the engine speed NE based on the relationship shown in FIG. 4(A). In this embodiment, the relationship between PDT and NE of FIG. 4(A) is stored in the ROM of the EEC 30 as a numerical map using NE as a parameter. At step 503, the PDT is determined from this numerical map.

Next, at step 505, the difference $\Delta$PD between the pressure setting PDT determined at step 503 and the actual deck pressure PD read at step 501 is calculated. At step 507, the drive current PDI of the actuator 25 (DC motor in this embodiment) of the WGV 26 is calculated as PDI=$\alpha\times$(PDT+$\beta\times\Delta$PD). Here, $\alpha$ and $\beta$ are constants. Further, at step 509, the value of the drive current PDI calculated as explained above is output to the drive circuit 69 of the DC motor 25. The routine then terminates. That is, since PDI is set as the sum of a value corresponding to the deck pressure setting ($\alpha\times$PDT) (feed forward term) and value determined according to the difference ΔPD between the PDT and the actual deck pressure PD (α×β×ΔPD) (feedback term), the degree of opening of the WGV 26 is controlled to a value giving the pressure setting PDT with a good response and high accuracy.

Next, another embodiment of control for bootstrap suppression control according to the present invention will be explained. In the embodiment of FIGS. 4(A), 4(B) and FIG. 5, the deck pressure setting PDT was set based only on the engine speed NE, but in the embodiment explained below the deck pressure setting PDT is determined considering not only the engine speed NE but also other engine operating conditions. In actual engine operation, the relationship between the engine speed NE and deck pressure PD when the WGV 26 is fully closed is sometimes not fixedly determined as shown in FIG. 3(A). For example, even if the engine speed is the same, the deck pressure PD changes, for example, due to the atmospheric pressure PA or atmospheric temperature TA. That is, when the atmospheric pressure PA is low, the inlet pressure of the turbocharger compressor falls, so even if the same compression ratio is obtained by the compressor, the outlet pressure of the compressor (that is, the deck pressure) will fall. Further, when the atmospheric temperature TA is low, even if the inlet pressure of the compressor is the same, the air density increases, so the outlet pressure of the compressor will rise. Therefore, even when operating the engine at the same speed, if the atmospheric pressure or atmospheric temperature change, the deck pressure will also change.

In particular, in the case of an aircraft, the atmospheric pressure and atmospheric temperature change due to the flying altitude, so sometimes the bootstrap operating region itself will change depending on the flying altitude. In fact, it is preferable not to fixedly determine the pressure setting PDT as shown in FIG. 4(A), but to decide on the PDT in accordance with the atmospheric pressure or atmospheric temperature.

Figure 6:
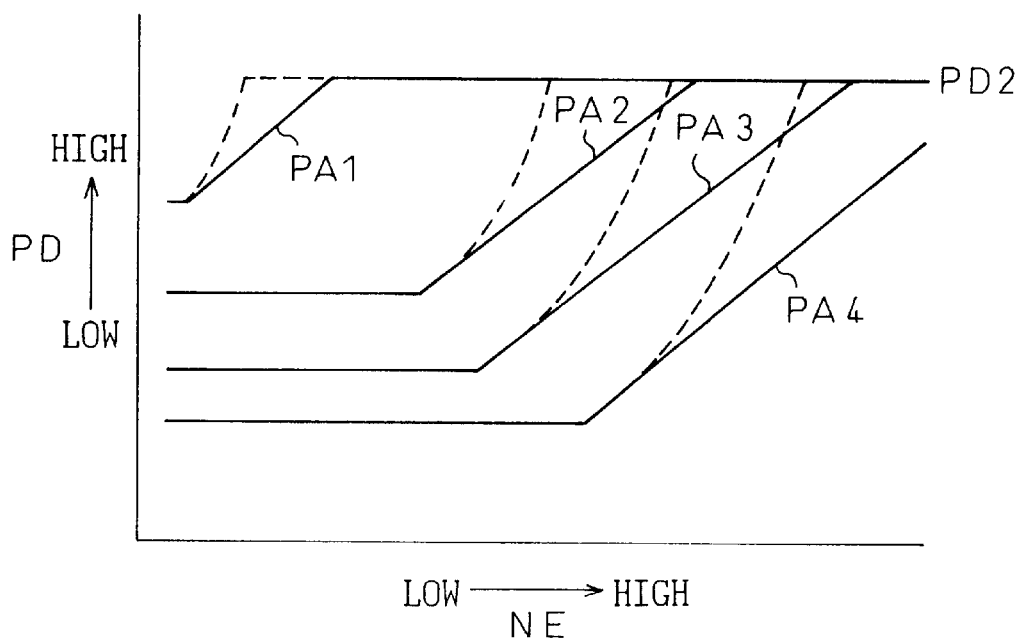
FIG. 6 is a graph explaining another embodiment of deck pressure control of the engine of FIG. 1.

For example, FIG. 6 shows the setting of the deck pressure target value PDT giving consideration to the change in the atmospheric pressure PA. In FIG. 6, the broken lines show the changes in the deck pressure PD at the fully closed condition of the WGV 26 for different atmospheric pressures PA. In the figure, PA1, PA2, PA3, and PA4 show the changes in the deck pressure PD due to the engine speed NE in the case of the atmospheric pressures at an altitude of 0 m (ground), 6000 m (20,000 ft), 7600 m (2500 ft), and 9100 m (30,000 ft). As shown in FIG. 6, the lower the atmospheric pressure, the more the deck pressure falls at the same engine speed. The bootstrap operating region also shifts to the high speed side as the atmospheric pressure becomes lower. Therefore, in this embodiment, the target deck pressure PDT is set for different atmospheric pressures (altitudes) as shown by the solid lines in FIG. 6. This enables the prevention of the occurrence of bootstrap regardless of the change in the atmospheric pressure.

Figure 7:
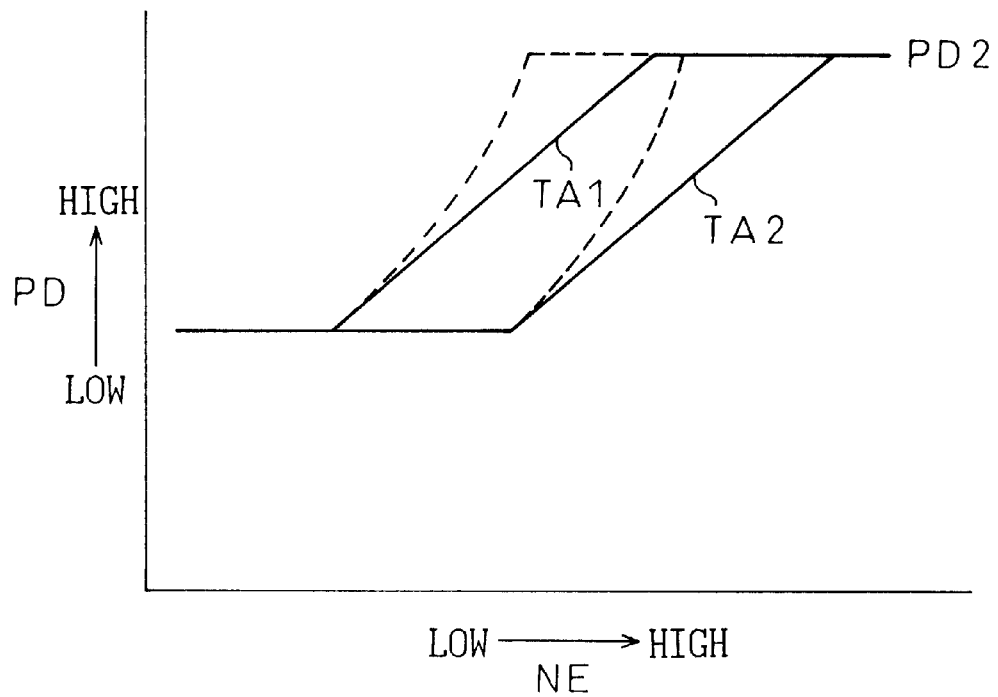
FIG. 7 is a graph explaining another embodiment of deck pressure control of the engine of FIG. 1.

Further, FIG. 7 shows the setting of the deck pressure target value PDT giving consideration to the atmospheric temperature TA. The broken lines in FIG. 7 show the characteristics of change of the deck pressure PD when the WGV 26 is fully closed in a constant atmospheric pressure. In FIG. 7, for example, TA1 shows the changes in the deck pressure PD in the case of minus 40° C. and TA2 the changes in the case of 0° C. As shown by the broken lines in FIG. 7, the deck pressure becomes higher the lower the atmospheric temperature at the same engine speed. The bootstrap operating region also shifts to the low speed side as the atmospheric temperature becomes lower. Therefore, in this embodiment, the deck pressure target value PDT is set as shown by the solid lines in FIG. 7 in accordance with the atmospheric temperature. Note that FIG. 7 shows the case of a constant atmospheric pressure, but in fact it is preferable to prepare the chart shown in FIG. 7 for each atmospheric pressure and set the PDT based on both of the atmospheric pressure and atmospheric temperature.

Note that in the above embodiment, the upper limit of the deck pressure is made the constant value PD2 regardless of the atmospheric pressure. The upper limit of the deck pressure is usually required to prevent the turbocharger compressor speed from rising excessively. However, in the actual operation, if the atmospheric pressure becomes low, the compression ratio of the turbocharger compressor may become excessively high before the upper limit PD2 is reached. Therefore, if the upper limit is set constant regardless of the atmospheric pressure, the turbocharger compressor speed may become excessively high when the atmospheric pressure falls. Accordingly, except the case in which there is sufficient margin in the allowable speed of the turbocharger (in such a case, the upper limit of the deck pressure can be set constant regardless of the flying altitude), or the case in which the engine is provided with a separate mechanism for preventing excessive speed of the turbocharger (for example, mechanism for forcibly opening the WGV when the compression ratio of the turbocharger rises above a predetermined value etc.), it becomes necessary to change the upper limit PD2 of the deck pressure in accordance with the atmospheric pressure.

Figure 8:
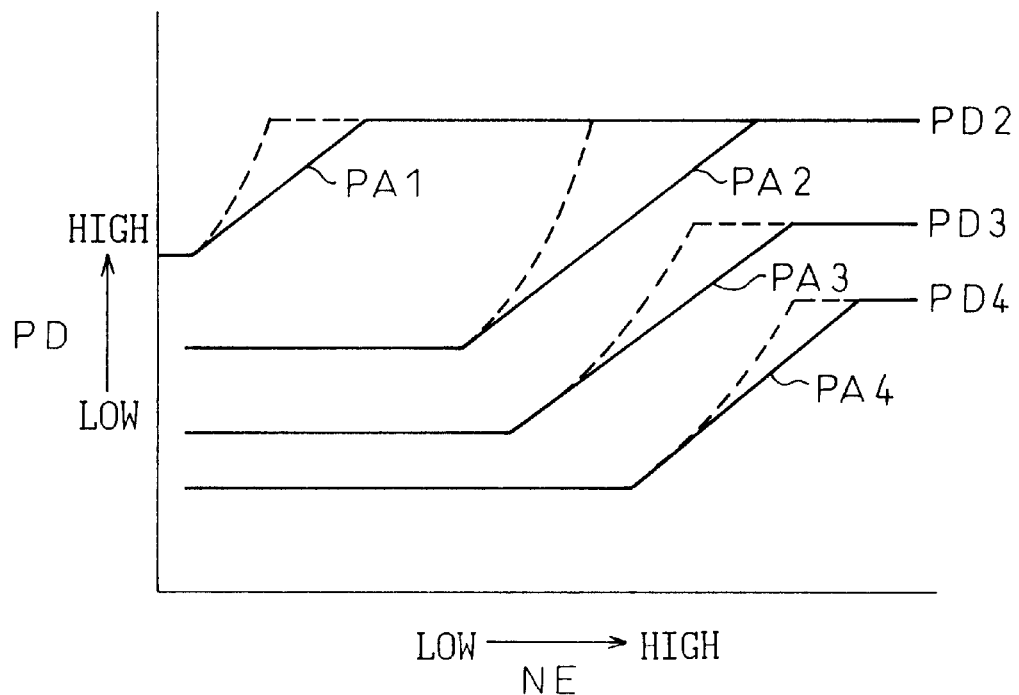
FIG. 8 is a graph explaining another embodiment of deck pressure control of the engine of FIG. 1.

Therefore, instead of setting the upper limit of the deck pressure PD to the constant value PD2 as shown in FIG. 6, the upper limit of the deck pressure PD may be changed for each atmospheric pressure as shown in FIG. 8. Here, the PD3, PD4, etc. in FIG. 8 are values determined by the atmospheric pressure and allowable compression ratio (allowable speed) of the turbocharger.

Figure 9:
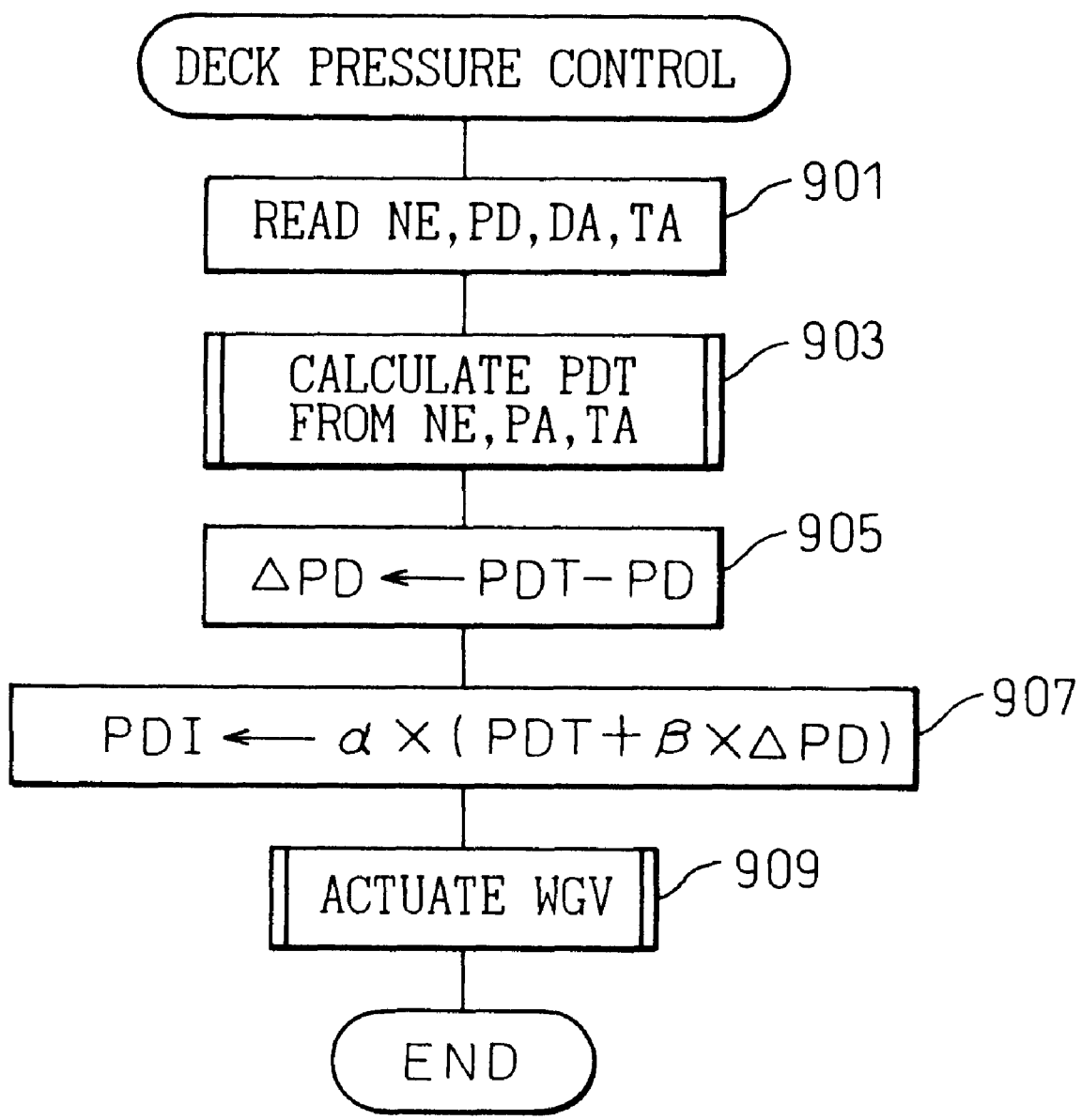
FIG. 9 is a flow chart showing the deck pressure control explained in FIG. 6.

FIG. 9 is a flow chart of the control of the deck pressure in which the deck pressure target value PDT is determined in accordance with the atmospheric pressure PA and atmospheric temperature TA. In the flow chart of FIG. 9, as compared with the flow chart of FIG. 5, at step 901, the atmospheric pressure PA and atmospheric temperature TA in addition to the NE and PD are read from the PA sensor 36 and TA sensor 37 and, at step 903, the NE, PA, and TA are used to set the target value PDT of the deck pressure based on the map of FIG. 7 prepared for each atmospheric pressure. This point constitutes the only difference from the flow chart of FIG. 5. By controlling the deck pressure PD as shown in FIG. 9, it becomes possible to reliably prevent the occurrence of bootstrap regardless of changes in the atmospheric pressure and atmospheric temperature due to the flying altitude.

Note that in the above embodiments, the degree of opening of the throttle valve and the speed setting of the governor were set simultaneously by the power lever, but in an engine which sets the degree of opening of the throttle valve and the speed separately, the deck pressure PD changes in accordance with the degree of opening TH of the throttle valve even at the same speed. That is, even at the same speed, if the degree of opening TH of the throttle valve becomes larger, the flow rate of the exhaust of the engine will also become larger, so the speed of the turbocharger will also rise. Therefore, if the engine speed is the same, the larger the degree of opening of the throttle valve, the more the deck pressure PD will rise. In this case the bootstrap operating region will also shift to the low speed side as the degree of opening of the throttle valve becomes larger. Therefore, in the case of such an engine, it is preferable that the deck pressure PD be set in consideration with the degree of opening TH of the throttle valve as well as the atmospheric pressure PA and atmospheric temperature TA. In this case, for example, the deck pressure setting for each atmospheric temperature of FIG. 7 is prepared for each of the various combinations of the atmospheric pressure and degree of opening of the throttle valve, and the optimal deck pressure PDT is determined and stored in the ROM of the EEC 30 in advance as a function of the speed NE, atmospheric pressure PA, atmospheric temperature TA, and degree of opening TH of the throttle valve. Further, at step 901 in FIG. 9, the degree of opening TH of the throttle valve is read from the throttle valve opening sensor 35, and at step 905, the deck pressure target value PDT is calculated based on the NE, PA, TA, and TH.

Next, another embodiment of the present invention will be explained.

In the above embodiment, the deck pressure target value (for example, FIG. 4(A) and FIG. 6 to FIG. 8) is determined using the characteristic of engine output/speed found by experiments etc. and this target value is used to control the deck pressure to suppress bootstrap. However, when the engine is operated for a long time, there is a possibility that the characteristic of engine output/speed will also change from the characteristic at the time when the deck pressure target value was set (characteristic in reference condition) due to changes in the characteristics of the parts of the engine, turbocharger, etc. If the characteristic of engine output changes due to aging etc. in this way, the bootstrap operating region will also change from the initially set region. Therefore, it is necessary to set the actual deck pressure target value with a sufficient margin considering the changes in the characteristic of engine output with time. In this case, it is necessary to set the deck pressure target value in the bootstrap operating region lower than necessary and thus the problem arises that the performance of the engine cannot be fully utilized in the bootstrap operating region. Thus, in the following embodiment, the characteristic of engine output/speed is constantly monitored during engine operation and learning correction is performed to correct the deck pressure target value PDT in accordance with the change in the characteristic.

Figure 10:
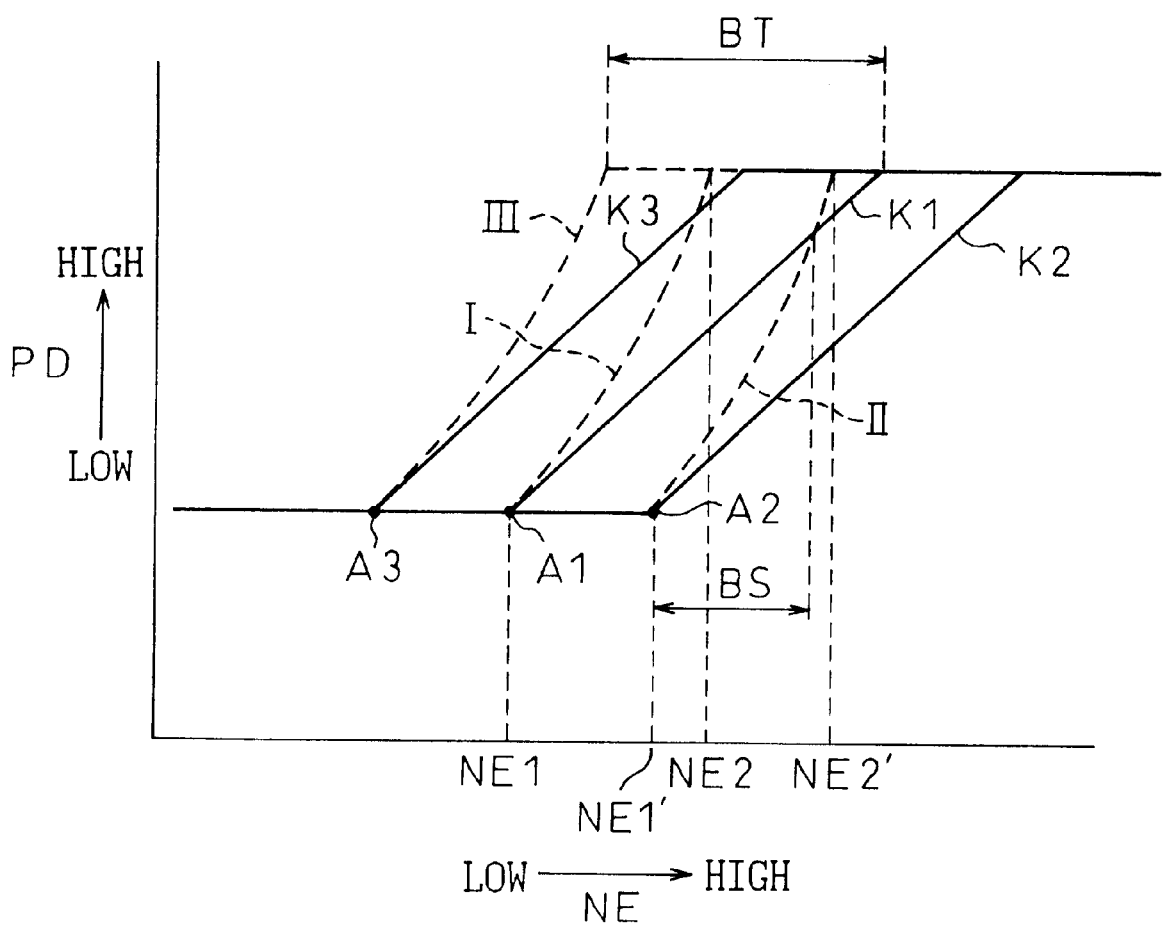
FIG. 10 is a graph explaining another embodiment of deck pressure control of the engine of FIG. 1.

Next, the learning correction of the deck pressure target value in this embodiment is explained with reference to FIG. 10. FIG. 10 is a view similar to FIG. 4(A) showing the relationship between the deck pressure PD and the speed NE in the case of a constant atmospheric pressure PA and atmospheric temperature TA. In FIG. 10, the curve I shows the changes in the deck pressure PD in the case where the target value of the deck pressure PD is set to the constant value PD2. The deck pressure PD sharply rises from the speed NE1 to NE2 since the WGV 26 is fully closed. That is, in the same way as in FIG. 4(A), the region of NE1≦NE<NE2 becomes the bootstrap operating region. As explained in FIGS. 4(A) and 4(B), to prevent the occurrence of bootstrap in this region, it is necessary to set the deck pressure target value PDT in the bootstrap operating region as shown by the line K1 in FIG. 10. Here, the gradient (dPD/dNE) of the line K1 shows the rate of change of the deck pressure where no bootstrap is caused and is a constant value determined from the characteristic of power consumption of the propeller.

Accordingly, as explained in the above embodiment, if the characteristic of engine output is represented by the curve I in FIG. 10, by setting the deck pressure target value PDT to the line K1, no bootstrap will occur even in the bootstrap operating region. However, if the characteristic of engine output changes from the curve I to the curve II due to aging of the engine etc., the bootstrap operating region also shifts in accordance with the change of the output characteristic and NE1'≦NE<NE2' becomes the bootstrap operating region after the change. In this case, if the deck pressure target value is set as shown by the line K1, for example, the WGV 26 is controlled to fully close in the region shown by BS in FIG. 10. This causes a sharp rise in the deck pressure PD in the region BS in FIG. 10 and bootstrap may occur. In this case, the target value of the deck pressure in this case has to be set as shown by the line K2 in FIG. 10. Conversely, when the characteristic of engine output changes as shown by the curve III, if the deck pressure is controlled by the line K1, the deck pressure will be lower than necessary in the region shown by BT in FIG. 10. In this case, the engine performance will not be able to be sufficiently utilized in the region BS. Therefore, in this case, the target value of the deck pressure PDT must be set as shown by K3 in FIG. 10. Note that the gradients of the lines K1, K2, and K3 are the same.

In this embodiment, the engine speed NE and deck pressure PD are constantly monitored, the point where the deck pressure starts to rise (for example, the points shown by A1, A2, and A3 in FIG. 10) is detected, a line with a constant gradient dPD/dNE is set from this point, and the line is set to the deck pressure target value PDT in this case (for example, the lines K1, K2, and K3 in FIG. 10). Note that the gradient dPD/dNE of the line is the rate of change of the maximum deck pressure where bootstrap will not occur as explained above and is determined from the characteristic of the power consumption of the propeller. Further, in this case as well, the deck pressure target value PDT is controlled so as not to exceed the upper limit PD2.

By controlling the deck pressure target value PDT in this way, it becomes possible to prevent the occurrence of bootstrap and obtain sufficient engine performance even when the characteristic of engine output changes.

Figure 11:
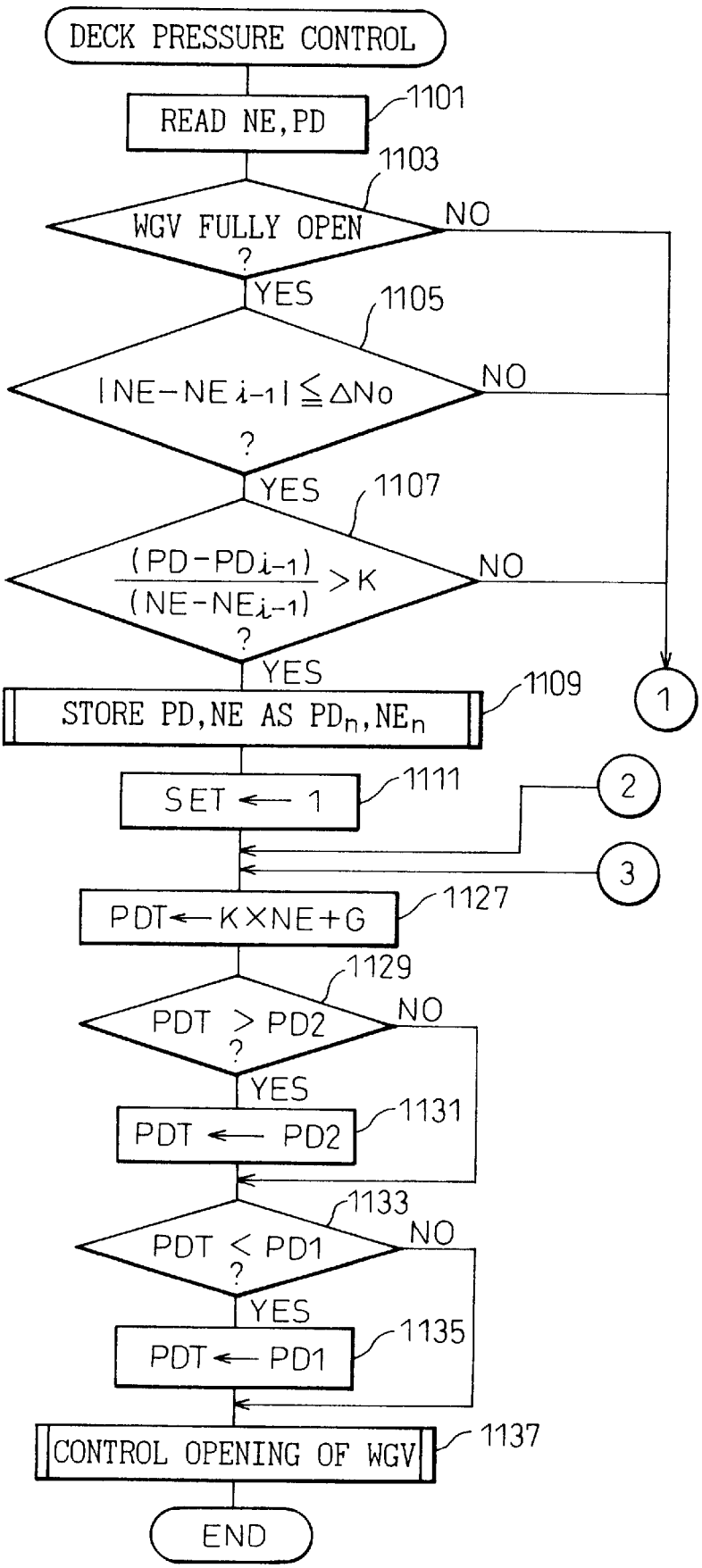
FIGS. 11 and 12 are a flow chart showing the deck pressure control explained in FIG. 10.
Figure 12:
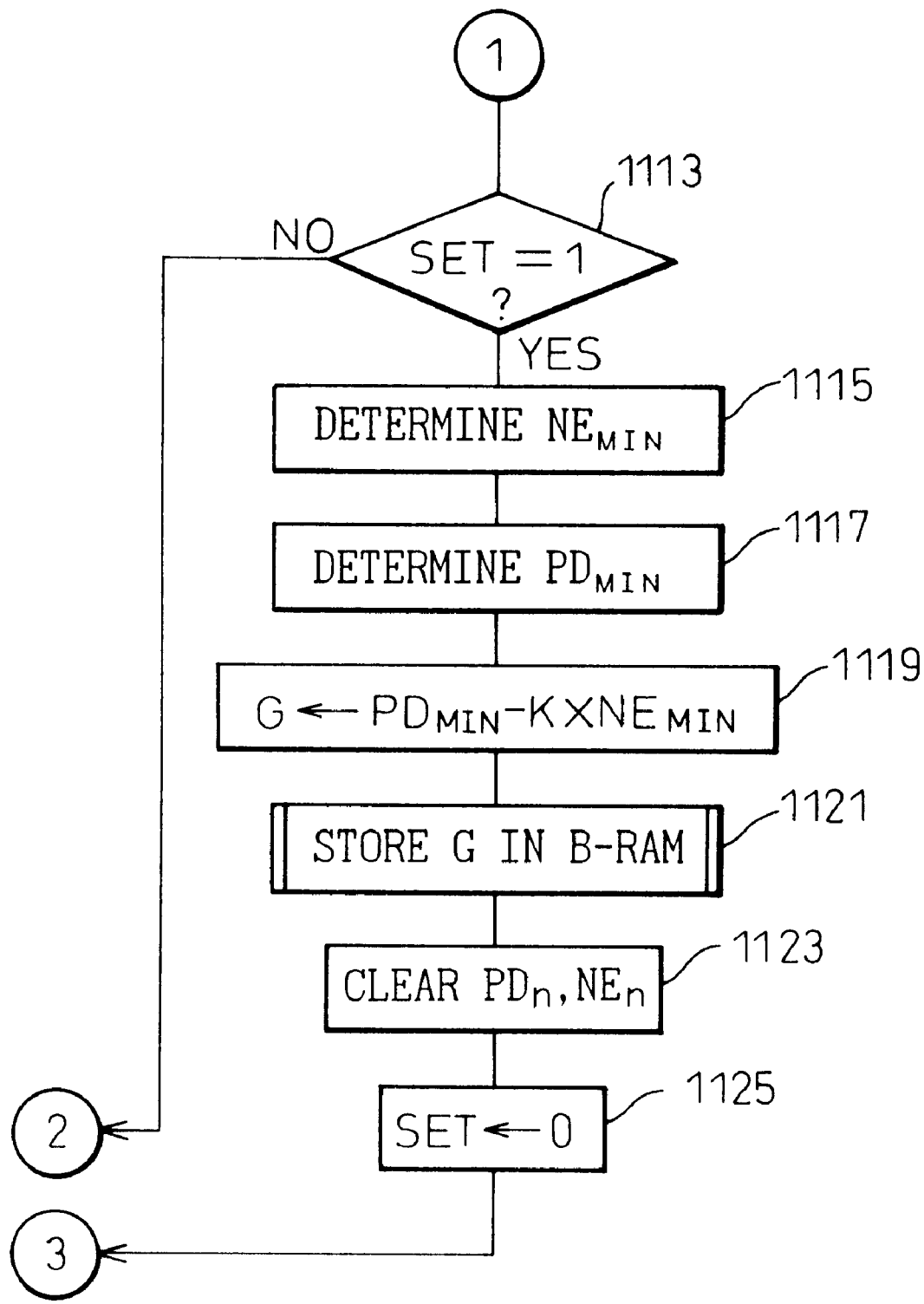

FIG. 11 and FIG. 12 are a flow chart showing the above deck pressure learning control.

This routine is executed by the EEC 30 every predetermined time interval.

In FIG. 11 and FIG. 12, steps 1103 to 1109 and 1115 to 1117 show the operation for detecting the starting point (for example, the points shown by A1, A2, and A3 in FIG. 10) of the bootstrap operating region in the current characteristic of engine output, while steps 1119 to 1127 show the operation for setting the deck pressure target value PDT (for example, the lines K1, K2, and K3 in FIG. 10) based on the starting point of the bootstrap operating region detected as explained above.

First, from step 1103 to 1109 in FIG. 11, when the WGV 26 is fully closed (step 1103) and the engine is not in a transitory operating condition (step 1105), the deck pressure PD and speed NE when the rate of change (dPD/dNE) of the deck pressure PD with respect to the speed NE becomes more than the upper limit K (K is the maximum rate of change considered necessary for suppressing bootstrap) are successively stored as $PD_n$ and $NE_n$ (n=1, 2, . . .), and the value of the flag SET is set to "1" (step 111).

Further, when any of the conditions from steps 1103 to 1107 are not satisfied, the routine proceeds to step 1113. Namely, step 1109 is executed only when the WGV 26 is fully closed at step 1103 so as to detect the starting point (for example, points shown by A1, A2, and A3 in FIG. 10) of the bootstrap operating region at the time when the WGV 6 is fully closed. Further, step 1109 is executed (step 1105) only when the engine is not in a transitory operating condition so as to prevent a fall in the accuracy of detection due to variations in the value detected at the time of a transitory operation. Note that at step 1105, it is judged that the engine is not in a transitory operating condition when the difference between the engine speed $NE_{i-1}$, at the time of the previous execution of the routine and the presently detected engine speed NE is less than a predetermined value $\Delta N_o$, that is, when there is little change in the engine speed NE over time.

Further, at step 1107, the rate of change of the deck pressure PD with respect to the speed NE (dPD/dNE) is calculated as the ratio of the difference between the deck pressure PD at the time of current execution of the routine and the deck pressure $PD_{i-1}$ at the time of the previous execution of the routine (that is, the amount of change of the deck pressure PD from the previous execution of the routine to the current execution of the routine) and the amount of change of the speed NE from the previous execution of the routine (that is, (dPD/dNE) =$(PD-PD_{i-1})/(NE-NE_{i-1})$). Further, at step 1109, the sets of the PD and NE where the above rate of change exceeds a predetermined value K are successively stored.

Further, after storing the sets of $PD_n$ and $NE_n$, where the rate of change (dPD/dNE) exceeds the predetermined value, at step 1111, the flag SET is set to "1". Due to this, when any of the conditions of steps 1103 to 1107 is no longer true, the routine from steps 1115 to 1125 of FIG. 12 is executed just once and the starting point of the bootstrap operating region is determined.

That is, at step 1115 of FIG. 12, the smallest speed among the speeds NE stored at step 1109 is stored as $NE_{MIN}$ and at step 1117 the value of the deck pressure PD corresponding to $NE_{MIN}$ is stored as $PD_{MIN}$. That is, $NE_{MIN}$ is the smallest speed where the condition (dPD/dNE)>K is true. Therefore, it can be considered as the starting point (for example, the points shown by A1, A2, and A3 in FIG. 10) of the bootstrap operating region in the current characteristic of engine output.

Further, at step 1119, the value of the constant G is calculated as $G=PD_{MIN}+K\times NE_{MIN}$. Here, the constant G is a constant for setting the line of the gradient K passing through the points shown by $PD_{MIN}$ and $NE_{MIN}$ in FIG. 10 (for example, the lines K1, K2, and K3 in FIG. 10).

The constant G calculated in this way is stored in a storing means (for example, backup RAM) able to hold the content stored even when the main switch of the engine is turned off. At steps 1123 and 1125, the values of $PD_n$, $NE_n$, etc. used for calculating the current G are cleared and the value of the flag SET is reset to "0". Due to this, at the time of next execution of the routine, when the conditions of steps 1113 to 1107 of FIG. 11 are not true, step 1127 is directly executed and steps 1115 to 1125 are not executed (step 1113).

Steps 1127 to 1135 show the setting of the deck pressure target value PDT using the constant G. At step 1127, the constant G and the speed NE detected at step 1101 are used to calculate the deck pressure target value PDT as $PDT=K\times NE+G$. Here, $PDT=K\times NE+G$ shows the line of the gradient dPD/dNE=K passing through the currently detected starting points ($NE_{MIN}$ and $PD_{MIN}$) of the bootstrap operating region. Further, in step 1129, when the thus calculated value of PDT is less than the lower limit PD1 or higher than the upper limit PD2, the value of PDT is set to PD1 or PD2. At step 1137, the degree of opening of the WGV 26 is controlled to give the set PDT value. Note that the control of step 1137 is the same as that from steps 505 to 509 of FIG. 5 or steps 905 to 909 of FIG. 9.

Due to the above routine, even when the characteristic of engine output changes from the curve I of FIG. 10 to the curve II or III, since the deck pressure target value is set to K2 or K3 for example in accordance with the change of the characteristic, it becomes possible to prevent the occurrence of bootstrap with a good precision even when a change occurs in the characteristic of engine output.

Note that in FIG. 10 to FIG. 12, the explanation was made of the case where the atmospheric pressure PA and atmospheric temperature TA were constant so as to simplify the explanation, but when the atmospheric pressure PA and atmospheric temperature TA change and further when the degree of opening TH of the throttle valve is controlled independent from the speed NE, similar control as that of FIG. 11 and FIG. 12 is possible. In this case, it is sufficient to set the value of the gradient K as a function of the atmospheric pressure PA and atmospheric temperature TA (and in appropriate cases the degree of opening TH of the throttle valve) and, at steps 1107, 1119, and 1127, to calculate the value of the gradient K in accordance with the actual PA and TA (or TH).

As explained above, according to the present invention, since the occurrence of bootstrap can be effectively prevented in the region where bootstrap used to occur in the past, stable operation of the engine in that region becomes possible. Therefore, there is the effect that the operable region of the engine is extended.

I claim:

1. A supercharged internal combustion engine comprising:
   a supercharger for supercharging intake air of the internal combustion engine;
   operating condition detecting means for detecting an operating condition of said engine;
   operating region judging means for judging if said operating condition is in a bootstrap operating region of said engine where there is a possibility of engine bootstrap occurring; and
   bootstrap suppressing means for suppressing an increase of engine output when it is judged by said operating region judging means that the engine is being operated in a bootstrap operating region.

2. A supercharged internal combustion engine as set forth in claim 1, wherein said operating condition detecting means is provided with speed detecting means for detecting a speed of said engine and said operating region judging means judges if the engine is being operated in a bootstrap operating region based on at least the engine speed.

3. A supercharged internal combustion engine as set forth in claim 2, wherein said supercharger is provided with a supercharging pressure control valve which opens when the supercharging pressure has become more than a predetermined pressure setting to suppress a rise in the air pressure at the outlet of the supercharger or the pressure of the exhaust gas at the inlet of the supercharger and thereby maintain the supercharging pressure at said pressure setting and wherein said bootstrap suppressing means opens said supercharging pressure control valve to suppress an increase in engine output when the engine is being operated in a bootstrap operating region even if the supercharging pressure is lower than said pressure setting.

4. A supercharged internal combustion engine as set forth in claim 3, wherein said bootstrap suppressing means is provided with first correcting means for correcting the degree of opening of said supercharging pressure control valve in accordance with the engine speed.

5. A supercharged internal combustion engine as set forth in claim 4, wherein said operating condition detecting means is further provided with throttle valve opening detecting means for detecting a degree of opening of a throttle valve of the engine and wherein said bootstrap suppressing means is provided with second correcting means for correcting the degree of opening of said supercharging pressure control valve based on the degree of opening of the throttle valve.

6. A supercharged internal combustion engine as set forth in claim 4, wherein said operating condition detecting means is further provided with atmospheric condition detecting means for detecting atmospheric conditions including at least one of an atmospheric temperature and an atmospheric pressure and wherein said bootstrap suppressing means is further provided with correcting means for correcting a degree of opening of said supercharging pressure control valve in accordance with said atmospheric conditions.

7. A supercharged internal combustion engine as set forth in claim 5, wherein said operating condition detecting means is further provided with atmospheric condition detecting means for detecting atmospheric conditions including at least one of an atmospheric temperature and an atmospheric pressure and wherein said bootstrap suppressing means is further provided with correcting means for correcting a degree of opening of said supercharging pressure control valve in accordance with said atmospheric condition.

8. A supercharged internal combustion engine as set forth in claim 1, wherein said operating condition detecting means is provided with speed detecting means for detecting an engine speed and output parameter detecting means for detecting an output parameter representative of the engine output and wherein said bootstrap suppressing means is provided with change rate calculating means for calculating a rate of change of said output parameter with respect to the engine speed and means for suppressing an increase in engine output so that said calculated rate of change becomes less than a predetermined reference rate of change when it is judged that the engine is being operated in a bootstrap operating region.

9. A supercharged internal combustion engine as set forth in claim 8, wherein said operating region judging means is further provided with bootstrap judging means for judging that the engine is in a bootstrap operating region based on at least the engine speed or the value of said output parameter, characteristic change detecting means for detecting deviation of a characteristic of change of said output parameter with respect to the engine speed-in actual operation from a characteristic of change in a predetermined reference condition, storing means for storing an amount of deviation of said characteristic of change, and learning correcting means for changing a reference region based on the stored deviation of the characteristic of change and wherein said bootstrap judging means judges that the engine is operated in a bootstrap operating region when the engine speed or the value of said output parameter is in the corrected reference region.

* * * * *